United States Patent [19]

Douglas et al.

[11] B 4,000,444
[45] Dec. 28, 1976

[54] ELECTRIC CIRCUIT BREAKER WITH GROUND FAULT PROTECTION

[75] Inventors: Ellwood S. Douglas; Richard C. Doyle, both of Orinda; David William Nestor, Oroville; Wallace W. Wahlgren, Oakland, all of Calif.

[73] Assignee: 3-M Company, St. Paul, Minn.

[22] Filed: Mar. 12, 1973

[21] Appl. No.: 340,170

[44] Published under the second Trial Voluntary Protest Program on March 30, 1976 as document No. B 340,170.

Related U.S. Application Data

[63] Continuation-in-part of Ser. No. 141,298, May 7, 1971, which is a continuation-in-part of Ser. No. 35,993, May 11, 1970.

[52] U.S. Cl. .................... 317/18 D; 317/58; 317/33 SC; 335/18
[51] Int. Cl.² ............................. H02H 3/28
[58] Field of Search ............. 317/18 D, 27 R, 119, 317/58, 21; 330/103, 11 P, 25, 143, 23; 335/18, 21, 168, 35, 8

[56] References Cited

UNITED STATES PATENTS

| 2,925,559 | 2/1960 | De Sautels | 330/23 |
| 3,041,544 | 6/1962 | Lindsay | 330/25 |
| 3,105,198 | 9/1963 | Higginbotham | 330/23 |
| 3,213,321 | 10/1965 | Dalziel | 317/18 |
| 3,264,571 | 8/1966 | Meindl et al. | 330/23 |
| 3,403,301 | 9/1968 | Mrowka et al. | 317/119 |
| 3,407,337 | 10/1968 | Benham | 317/18 |
| 3,431,469 | 3/1969 | Stanback | 317/119 |
| 3,440,580 | 4/1969 | Molenaar | 335/18 |
| 3,486,140 | 12/1969 | Harper | 335/168 |
| 3,506,906 | 4/1970 | Nestor | 317/18 D |
| 3,539,867 | 11/1970 | Edmunds | 317/18 |
| 3,555,359 | 1/1971 | Morris et al. | 317/18 |
| 3,566,189 | 2/1971 | Wilson et al. | 317/18 |
| 3,611,035 | 10/1971 | Douglas | 317/18 D |

*Primary Examiner*—William M. Shoop
*Assistant Examiner*—Patrick R. Salce
*Attorney, Agent, or Firm*—Flehr, Hohbach, Test, Albritton & Herbert

[57] ABSTRACT

Electric circuit breaker including highly sensitive ground fault responsive means for protecting human life from electrical shock. The circuit breaker is suitable for mounting in a panelboard at the service entrance of a building to provide ground fault protection for the individual branch circuits in the building.

14 Claims, 10 Drawing Figures

INVENTORS
ELLWOOD S. DOUGLAS
RICHARD C. DOYLE
DAVID WILLIAM NESTOR

BY Flehr, Hohbach, Vest,
Albritton & Herbert
ATTORNEYS

INVENTORS
ELLWOOD S. DOUGLAS
RICHARD C. DOYLE
DAVID WILLIAM NESTOR

BY Flehr, Hohbach, Test,
Albritton & Herbert
ATTORNEYS

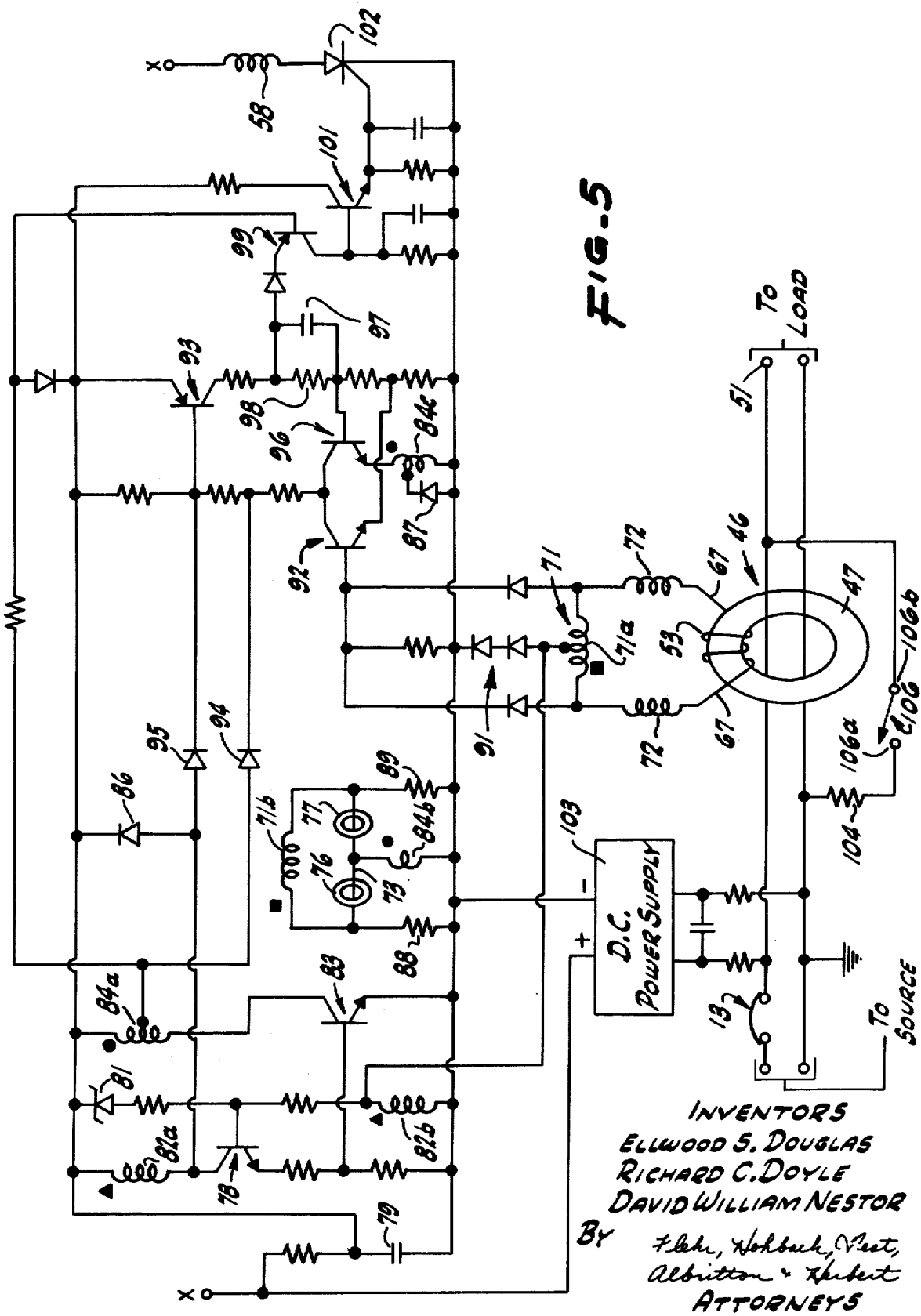

INVENTORS
ELLWOOD S. DOUGLAS
RICHARD C. DOYLE
DAVID WILLIAM NESTOR

By

Flehr, Hohbach, Test,
Albritton & Herbert
ATTORNEYS

ELECTRIC CIRCUIT BREAKER WITH GROUND FAULT PROTECTION

CROSS-REFERENCE TO RELATED APPLICATIONS

This is a continuation-in-part of copending application Ser. No. 141,298, filed May 7, 1971, a continuation-in-part of Ser. No. 35,993, filed May 11, 1970.

BACKGROUND OF THE INVENTION

This invention pertains generally to electric circuit breakers and ground fault interrupters and more particularly to a branch circuit breaker having a ground fault interrupter for protecting human life against electrical shock.

Electric circuit breakers of the prior art commonly include means for protecting a circuit against "overcurrent" conditions wherein the current through the breaker is in the order of 125% to 300% of the nominal rating of the breaker and against "short circuit" conditions wherein the current is in excess of approximately 300% of the nominal rating. Such circuit breakers are available in a wide range of physical sizes and current ratings.

Some attempts have heretofore been made to incorporate ground fault protection in some of the larger circuit breakers. Such attempts have included the use of bimetallic strips for detecting an imbalance in the currents to and from a protected circuit and the use of a differential transformer having a plurality of primary windings for detecting the current imbalance and a secondary winding connected directly to a trip coil for actuating the trip mechanism of the breaker. Such techniques are capable of detecting fault currents on the order of 25% of the normal load current, and they therefore provide some protection for property. They, however, are not suitable for protecting human life which requires the detection of fault currents on the order of 3 to 50 milliamperes with load currents ranging on the order of 10 to 100 amperes.

There is, therefore, a need for a new and improved electric circuit breaker which includes means for protecting human life against electrical shock.

SUMMARY AND OBJECTS OF THE INVENTION

The present invention provides a circuit breaker which includes highly sensitive ground fault responsive means for protecting human life against electrical shock. This circuit breaker is suitable for mounting in a panelboard at the service entrance of a building to provide ground fault protection in an individual branch circuit.

It is in general an object of the present invention to provide a new and improved electric circuit breaker which includes ground fault responsive means for protecting human life against electrical shock.

Another object of the invention is to provide an electric circuit breaker of the above character which is suitable for providing ground fault protection in individual branch circuits.

Another object of the invention is to provide an electric circuit breaker of the above character which includes means for indicating when the breaker has tripped in response to a ground fault current, rather than an overcurrent or short circuit.

Additional objects and features of the invention will be apparent from the following description in which the preferred embodiments are set forth in detail in conjunction with the accompanying drawing.

BRIEF DESCRIPTION OF THE DRAWING

FIG. 5 is a schematic diagram of one presently preferred magnetic flux storage circuit for use in the present invention.

DESCRIPTION OF THE PREFERRED EMBODIMENT

Figure 1:
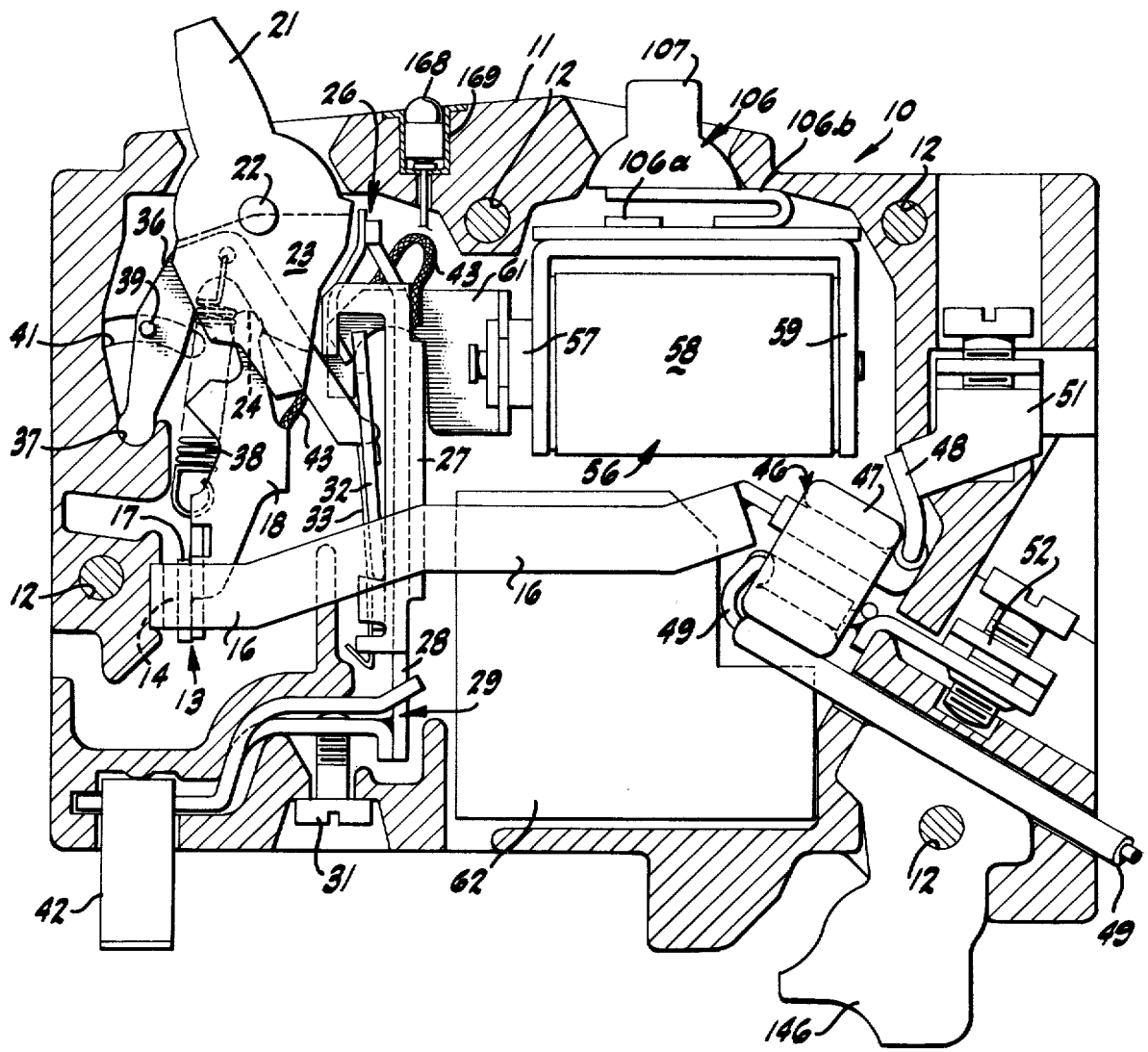
FIG. 1 is a front elevational view, partly in section, of one embodiment of a circuit breaker incorporating the present invention.

In the drawing, the invention is shown as incorporated in a single pole electric circuit breaker of the type commonly used for protecting branch circuits. Such breakers typically have current ratings on the order of 15 to 50 amperes.

Figure 2:
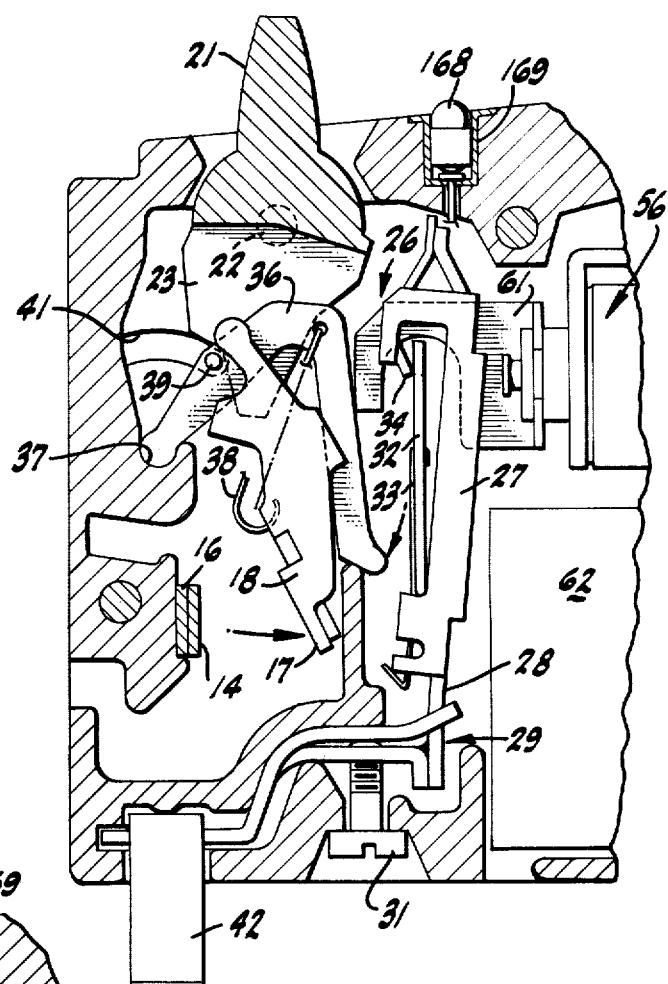
FIG. 2 is an operational view of a portion of the embodiment shown in FIG. 1, illustrating the circuit breaker in its tripped condition following an overcurrent.
Figure 3:
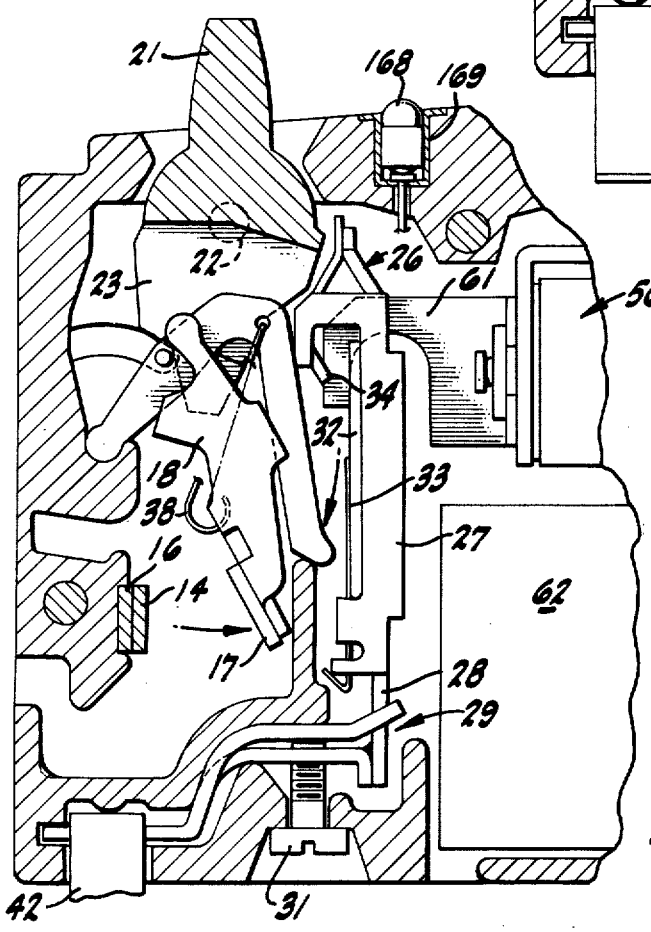
FIG. 3 is an operational view of a portion of the embodiment shown in FIG. 1, illustrating the circuit breaker tripped by a ground fault current.

This circuit breaker, designated generally by the reference number 10, includes a casing 11 fabricated of an insulative material. This casing consists of two parts, only one of which is illustrated in FIGS. 1-3, the other being substantially identical to the part shown. The two parts are normally held together by means of rivets passing through the openings 12.

A set of electrical contacts 13 is mounted within the casing 11 and adapted for movement between open and closed positions. This set includes a stationary contact 14, carried by a terminal strap 16, and a moveable contact 17 carried by a contact arm 18.

Means is provided for moving the contacts between open and closed positions. This means includes an operating handle 21 which is pivotally mounted in recesses formed in the two parts of the casing by means of pivot pins 22. The handle 21 includes a forked portion comprising two spaced apart parallel members 23, the outermost one of which has been removed from FIGS. 2 and 3 for convenience in illustrating certain parts of the trip mechanism of the circuit breaker. The upper extremity of the contact arm 18 engages recesses 24 formed in the fork members 23.

An actuator assembly 26 provides means for opening the contacts 13 in response to overcurrent and short circuit conditions. This assembly includes a generally U-shaped frame member 27 carried by a bimetallic strip 28, the lower end of which is secured to the casing 11 through a conductive strap assembly 29. A calibration screw 31 threadedly engages the conductive strap assembly 29 to provide means for adjusting the position of the actuator assembly to calibrate the trip level of the breaker. The actuator assembly also includes an armature member 32 pivotally mounted to the frame member 27 by means of a flat spring 33 which urges the upper portion of the armature member 32 away from the frame member 27. The travel of the upper portion of the armature is limited by a stop 34 carried by the frame member 27.

A cresent shaped latch member 36 extends through the space between the fork member 23 of the operating handle 21. One end of this latch member is pivotally mounted in a recess 37 formed in the casing 11, and the other end is adapted to be releasably engaged by the armature member 32. A tension spring 38 extends between the contact arm 18 and the central portion of the latch member 36. A pin 39 extends through the latch member 36 and is adapted for sliding movement in arcuate recesses 41 formed in the two parts of the casing.

A line terminal 42 is attached to the conductor assembly 29 and extends externally of the casing 11 for engaging a current carrying bus bar. A flexible braided conductor 43 is connected between the contact arm 18 and the upper portion of the actuator assembly 27. For ease of illustration, this conductor is shown only in FIG. 1.

Operation and use of the portions of the circuit breaker thus far disclosed can now be described. When the contacts 13 are closed, as illustrated in FIG. 1, current passes from the line terminal 42 to the terminal strap 16 by means of the conductive strap assembly 29, the actuator assembly 26, the flexible conductor 43, the contact arm 18, and the contacts 13.

When the contacts 13 are closed, the actuator assembly armature member 32 is in its extended position and engages the latch member 36, as illustrated in FIG. 1. When an overcurrent condition exists, the current passing through the bimetallic strip 28 causes that strip to bend, drawing the entire actuator assembly 27 away from the latch member 36 until the latch member is released from the arm member 32. This releasing initiates tripping of the breaker, and the latch member falls to the position illustrated in FIG. 2, allowing the tension spring 38 to draw the contact arm 18 away from the contact 14, thereby opening the contacts and interrupting the flow of current through the terminal strap 16.

When a short circuit condition exists, an excessive current flows through the armature assembly frame member 27, creating a magnetic field which draws the armature member 32 away from the latch member 36, thereby initiating tripping of the breaker.

Once the overcurrent condition or short circuit condition which produced tripping of the breaker has been removed, the breaker can be reset by means of the operating handle 21. To reset the breaker, this handle is first rotated in a clockwise direction, with the fork members 23 engaging the pin 39 to move the latch member 36 back into latching engagement with the armature member 32 of the actuator assembly. The handle is then rotated in a counterclockwise direction, and the spring 38 draws the contact arm 18 back to the closed contact position illustrated in FIG. 1. If desired, the contacts can be opened manually by moving the handle 21 clockwise from its counterclockwise position.

Highly sensitive ground fault responsive means is also included in the circuit breaker for opening the contacts in response to ground fault currents on the order of 3 to 5 milliamperes. This level of sensitivity is desirable from the standpoint of protecting human life against electrical shock.

The ground fault responsive means includes a differential transformer 46 having a toroidal core 47 fabricated of a magnetic material. A line conductor 48 and a neutral conductor 49 pass through the opening in the toroidal core, forming single turn primary windings. One end of the line conductor 48 is connected to the terminal strap 16 and the other end is connected to a line terminal 51 adapted for connection to the circuit to be protected. One end of the neutral conductor 49 is connected to a neutral terminal 52 and is thus adapted for connection to the protected circuit. The other end of the conductor 49 passes out through an opening in the casing 11 to be connected to the neutral conductor from a source. The differential transformer also includes a secondary winding 53 comprising a plurality of turns wound on the core 47. This secondary winding is connected to the remainder of the ground fault responsive means in a manner described hereinafter in detail.

The ground fault responsive means also includes a solenoid assembly comprising an armature 57, an operating coil 58, and a frame 59 mounted to the casing 11. The armature 57 is adapted for movement between an extended position, illustrated in FIG. 1, and a retracted position, illustrated in FIG. 3, in response to energization of the operating coil 58. A latch hook 61 is attached to the armature 57 and disposed for engaging the armature member 32 of the actuator assembly 26. Thus, energization of the operating coil 58 causes the latch hook 61 to draw the armature member 32 away from the latch member 36 to initiate tripping of the breaker.

Signal conditioning means is provided for receiving fault current signals from the secondary winding 53 of the differential transformer and energizing the operating coil 58 of the solenoid in response thereto. This signal conditioning means can be constructed on a printed circuit board mounted within the casing 11 as indicated by the reference numeral 62.

Figure 4:
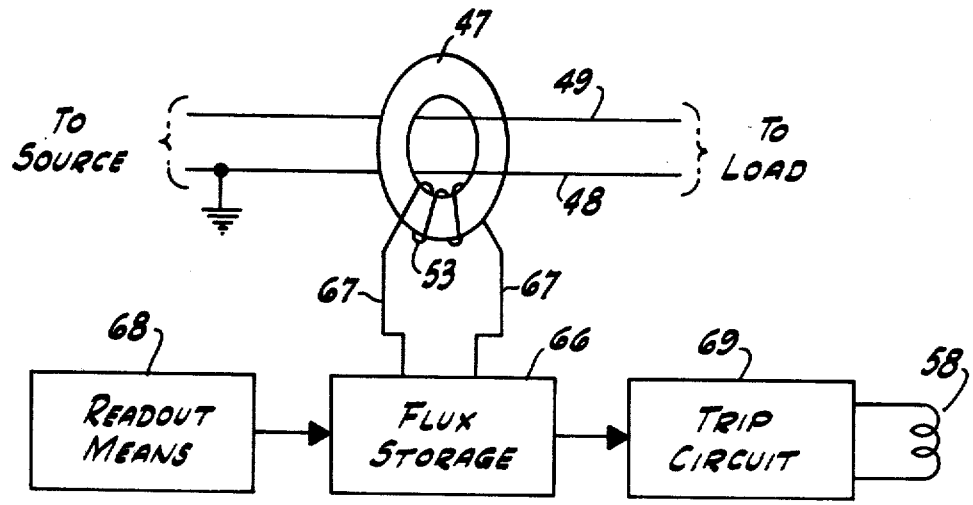
FIG. 4 is a block diagram of one embodiment of a ground fault responsive system of the flux storage type for use in the present invention.

In one presently preferred embodiment, the signal conditioning means comprises a magnetic flux storage circuit of the type disclosed in copending application Ser. No. 18,158, filed Mar. 10, 1970, and assigned to the assignee of the present invention. Such a circuit is illustrated in block form in FIG. 4 and includes flux storage means 66 connected to the differential transformer secondary winding 53 through conductors 67, 67. The flux storage means is adapted for receiving the fault signal from the secondary winding 53 and storing the fault signal in the form of a magnetic flux signal. Readout means 68 is provided for reading the stored flux signal out of the storage means, and trip circuit means 69 is connected intermediate the storage means 66 and operating coil 58 of the solenoid for energizing the operating coil in response to the flux signal readout of the storage means.

One presently preferred embodiment of a flux storage circuit is illustrated in schematic form in FIG. 5. In this circuit, the secondary winding 53 of the differential transformer is connected to the primary winding 71a of a coupling transformer 71 through conductors 67, 67 and inductors 72, 72. The secondary winding 71b of the coupling transformer is connected to signal turn windings 73 and 74 of reactor cores 76 and 77, respectively. Thus, fault signals appearing in the secondary winding 53 of the differential transformer are coupled by the coupling transformer 71 to the reactor cores 76 and 77 where they are stored in the form of magnetic flux signals.

A blocking oscillator is provided for reading stored flux signals out of the reactor cores 76 and 77. This blocking oscillator includes a transistor 78, a capacitor 79, a zener diode 81, a first transformer 82 having windings 82a and 82b, a second transistor 83, and a second transformer 84 having windings 84a, 84b, 84c. Clamping diodes 86 and 87 are connected for limiting the inverse voltage surges across the windings of the transformers 83 and 84, respectively. The transformer 82 is adapted to saturate before the transformer 84 so that the transformer 82 controls the timing of the blocking oscillator, and the transformer 84 delivers the power output. The pulsating output of the blocking oscillator is applied to the reactor course 76 and 77 through the winding 84b and resistors 88 and 89.

After being read out of the reactor cores 76 and 77, the stored flux signals are delivered back to the primary winding 71a of the coupling transformer 71. From this winding the readout signals are applied through a temperature compensating diode network 91 to the base of a transistor 92. This transistor together with a second transistor 93 constitute an amplifier of constant gain whch is gated on by pulses from the blocking oscillator applied through diodes 94 and 95. The base of a third transistor 96 is connected to a voltage divider in the collector circuit of the transistor 93. The transistor 96 remains off until its base voltage rises above the level of its emitter voltage. At this time, this transistor turns on hard saturating itself and the transistor 93. The transistor 93 remains turned on throughout the duration of the pulse applied through the diodes 94 and 95. The termination of the pulse turns off the transistor 93.

A capacitor 97 is connected across one of the resistors 98 in the voltage divider in the collector circuit of the transistor 93. Each time the transistor 93 is turned on by a pulse, a known current is delivered to the capacitor 97. Thus, this capacitor functions as an accumulator, with the voltage across it increasing in steps to the level desired to produce tripping. The resistor 98 serves as a bleeder for discharging the capacitor 97 when the interval between fault signals is greater than that desired for producing tripping. The capacitor 97 is connected for turning on a transistor 99 when the voltage across the capacitor has reached a predetermined level corresponding to the desired number of fault signals. The transistor 99 turns on a transistor 101 which triggers a silicon controlled rectifier 102. The cathode of this SCR is connected to the negative terminal of a source of direct current, and the anode is connected to one terminal of the operating coil 58 of the solenoid 56. The other terminal of this coil is connected to the positive terminal of the direct current source.

In the embodiment illustrated in FIG. 5, operating power for the circuit is supplied by a DC power supply 103 operated by alternating current from the conductors in the protected circuit. As illustrated, the power supply is connected on the load side of the breaker contact 13 so that opening of this contact removes the operating power from the circuit. Alternatively, the power supply can be connected on the source side of the breaker contact. In this case, reset means should be provided for interrupting the flow of current to the SCR 102 when the ground fault has been corrected. This means can include a normally closed switch connected in series with one of the power supply leads and linked mechanically to the circuit breaker operating handle 21.

Means is provided for testing the operation of the ground fault detector shown in FIG. 5. This means includes a resistor 104 and a normally open switch 106. The resistor is connected between the conductor 49 and a first contact 106a of the switch. The remaining contact 106b of the switch is connected to the conductor 48 on the opposite side of the differential transformer from the resistor 104. Thus, a ground fault can be simulated by momentarily closing the switch 106 to upset the balance of current flowing through the differential transformer. The switch 106 is also illustrated in FIG. 1 together with an operating button 107.

Figure 6:
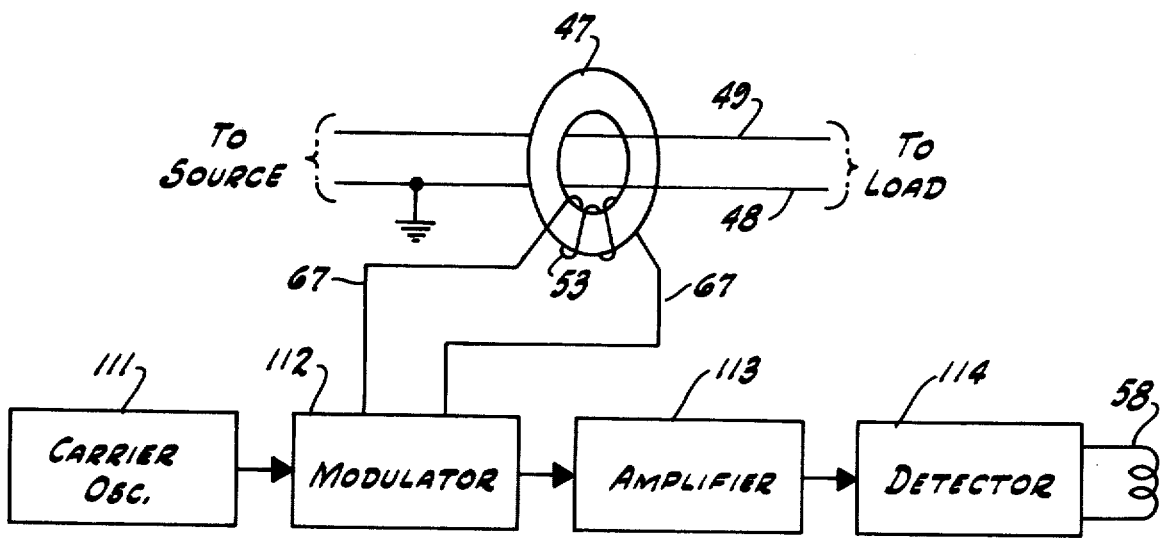
FIG. 6 is a block diagram of one embodiment of a ground fault responsive system utilizing modulation.

Alternatively, the signal conditioning means can comprise a modulation system of the type disclosed in copending U.S. application Ser. No. 19,625, filed Mar. 16, 1970, and assigned to the assignee of the present invention. This type of system is illustrated in block form in FIG. 6 and includes a carrier oscillator 111, a modulator 112, an amplifier 113, and a detector 114. The modulator is connected to the secondary winding of the differential transformer through conductors 67 and is adapted for modulating the signal from the carrier oscillator with the fault signal from the secondary winding. The modulated carrier signal is then amplified in the amplified 113 which can be a radio frequency amplifier. The amplified signal is then passed to the detector 114 where the fault signal information is removed and applied to the operating coil 58 of the solenoid 56.

Figure 7:
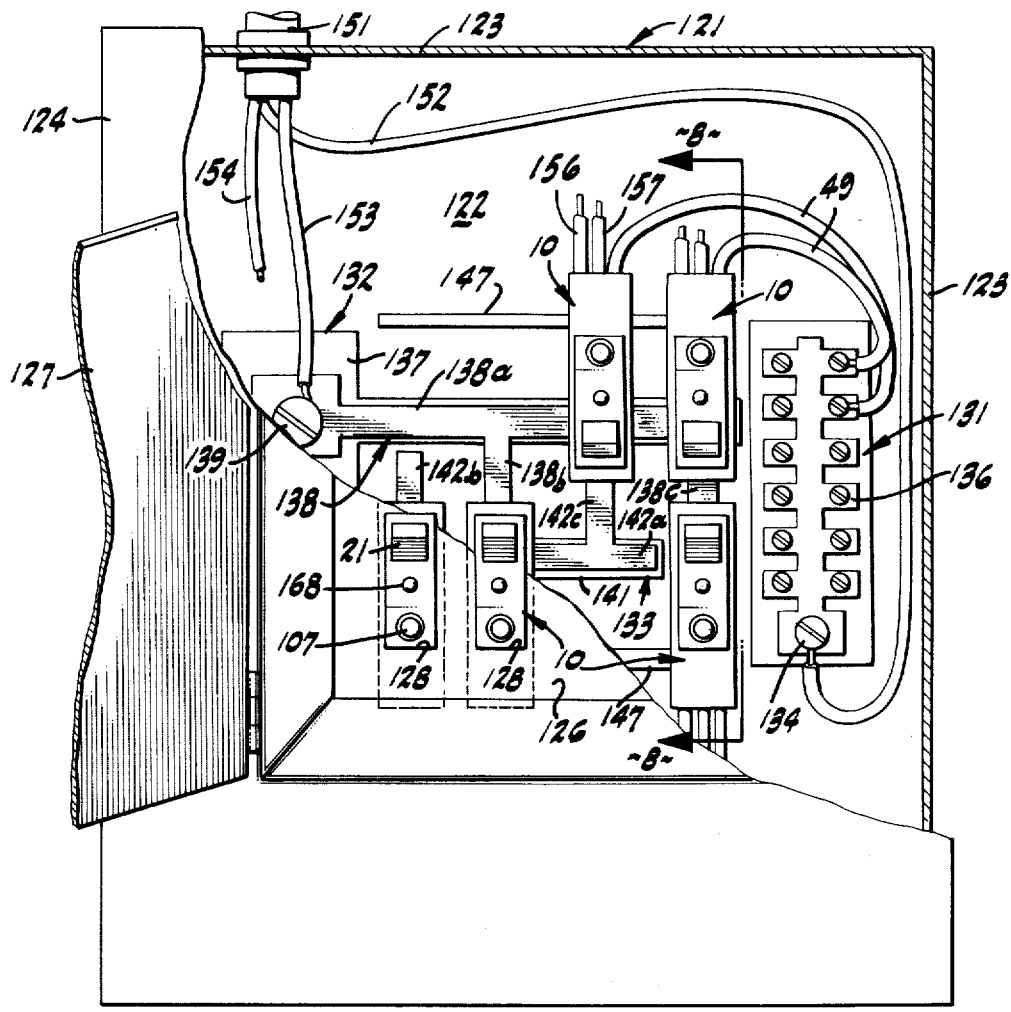
FIG. 7 is a front elevational view, partly broken away, of one embodiment of a panel board assembly incorporating the present invention.
Figure 8:
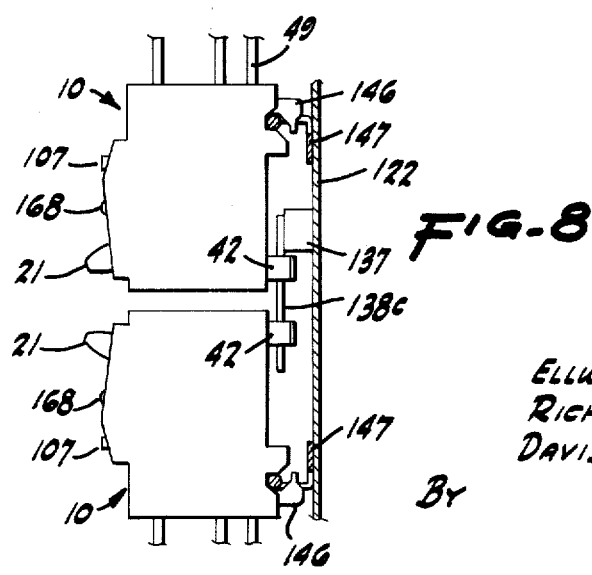
FIG. 8 is a side elevational view taken along line 8-8 in FIG. 7.

FIGS. 7 and 8 illustrate a panelboard of the type adapted for use at the electrical service entrance of a building and incorporating the present invention. This assembly includes a housing 121 in which a plurality of circuit breakers 10 of the type hereinbefore described are mounted for providing individual ground fault protection for a plurality of branch circuits.

The housing 121 is fabricated of sheet metal and includes a back wall 122, side walls 123, and a removable cover 124 attached to the side walls 123 by means of screws, not shown. The cover 124 includes a recessed area 126 and a hinged door 127 adapted for covering the recessed area when closed. The area 126 is formed to include a plurality of openings 128 through which a portion of the breaker casings 11 extend to provide access to the operating handles 21, ground fauls circuit test buttons 107, and indicator lamps 108.

Terminal blocks are provided within the housing 121 for connection to the main lines or service lines. The panelboard shown in the drawing is wired for a conventional three wire, 120/240 volt system. Thus, three terminal blocks are provided: a neutral block 131 and line blocks 132, 133. The neutral terminal block includes an input terminal 134 and a plurality of interconnected output terminals 136.

The line terminal blocks 132, 133 are partially hidden from view by the housing cover 124. These terminal blocks are of conventional design, and the block 132 includes an insulative base number 137 and a bus bar 138. The bus bar includes a main portion 138a having fingers 138b and 138c extending therefrom. The main portion of the bus bar is supported by the insulative member 137, and the fingers are adapted to be engaged by the line terminals 42 of the circuit breakers 10. A screw terminal 139 provides means for connecting the main line or service line to the bus bar 138.

The terminal block 133 is similar to the terminal block 132, its insulative base member being designated by the reference number 141 and its bus bar by 142. This terminal block also includes a screw terminal for receiving a service line conductor.

Each of the circuit breakers 10 is provided with a mounting cam 146, and the panelboard housing is provided with slotted rail members 147 for receiving these mounting cams.

The service line or main line 151 is brought into the panelboard through an opening in one of the side walls 123. Since the panelboard is illustrated as being wired for a conventional 120/240 volt, three-wire system, the service lead includes a neutral conductor 152 and two line conductors 153, 154. The neutral conductor 152 is connected to the input terminal 134 of the neutral terminal block 131. The first line conductor 153 is connected to the terminal screw 139 of the terminal block 132, and the remaining line conductor 154 is connected to the terminal block 133 in a like manner. Thus, 120 volts is available between each of the bus bars 138, 142 and the neutral terminals 136.

In a panelboard utilizing conventional circuit breakers, the neutral conductors of the brach circuits could be directed directly to the neutral terminals 136. However, because of the ground fault responsive means in the circuit breakers 10, it is necessary to pass the branch circuit neutral conductors through the differential transformers in the circuit breakers. Thus, the neutral conductor 49 of each of the circuit breakers is connected to one of the terminals 136. The conductors 156 and 157 for each branch circuit are connected to the load terminals 51 and 52, respectively, for that circuit.

Figure 9:
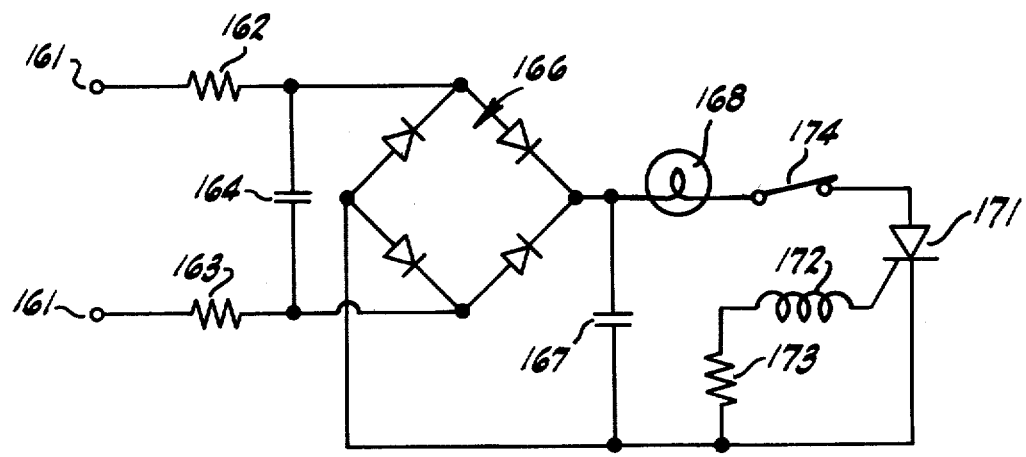
FIG. 9 is a schematic diagram of one embodiment of means for indicating when tripping of the breaker is due to a ground fault current rather than a short circuit or an overcurrent.

Means is provided for indicating when tripping of the circuit breaker is due to a ground fault current rather than an overcurrent or a short circuit. One embodiment of a circuit for giving this indication electronically is illustrated in FIG. 9. This embodiment includes a pair of input terminals 161 adapted to be connected for receiving operating power from the alternating current source ahead of the breaker contacts 13. A filter network consisting of resistors 162, 163 and a capacitor 164 is connected to these terminals and provides both filtering and protection against excessive voltage spikes. The alternating current is rectified by a diode bridge 166, and the pulsating DC is filtered by a capacitor 167 connected across the output of the bridge. This constantly operating Dc supply provides direct current for an indicator lamp 168 which is mounted in a socket 169 in the casing 11 and visible externally of the casing. Energization of the lamp 168 is controlled by a silicon control rectifier 171 connected in series with the lamp. The gate of the SCR is connected to a coil 172 and returned to the negative output of the diode bridge through a resistor 173. The coil 172 is wound on the solenoid 56 in proximity to the solenoid coil 58. Thus, when the coil 58 is energized in response to a ground fault current, a voltage is induced in the coil 172, turning on the SCR 171. The resistor 173 limits the level of current flowing through the gate of the SCR 171. A normally closed reset switch 174 is connected in series with the lamp and SCR to provide means for turning them off after a ground fault has been corrected. If desired, this switch can be linked mechanically with the operating handle 21 of the circuit breaker.

Since ignition of the lamp 168 is initiated by the energization of the solenoid coil 58, this lamp is ignited only when tripping of the breaker is due to a ground fault current rather than an overcurrent or short circuit. The lamp remains lighted until turned off by the reset switch 174. Alternatively, if desired, a mechanical device such as a flag can be linked to the solenoid to provide a visible indication that tripping is due to a ground fault.

Figure 10:
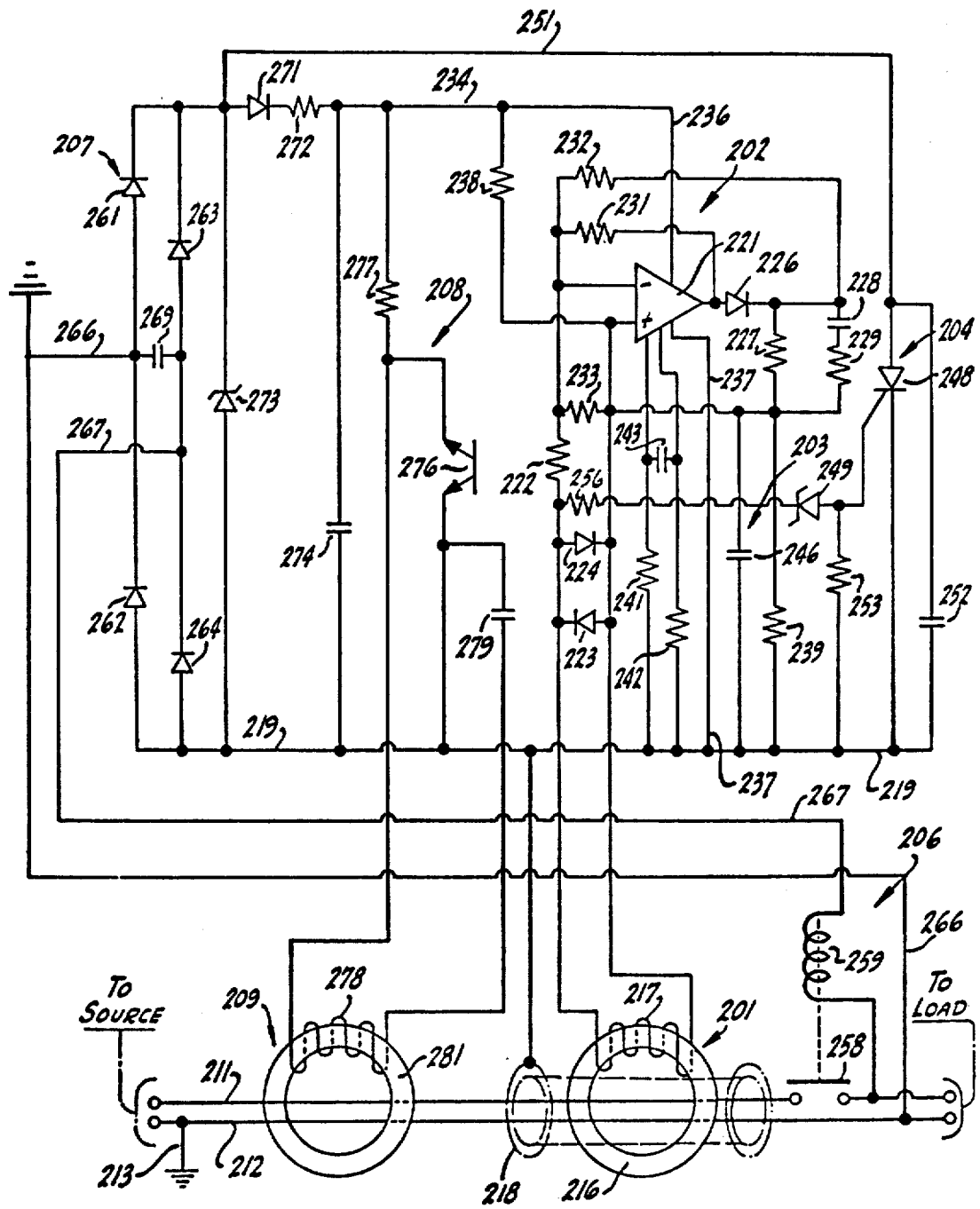
FIG. 10 is a schematic diagram of another embodiment of a ground fault sensing system which can be incorporated in the circuit breaker of the present invention.

FIG. 10 illustrates another highly sensitive ground fault responsive system which can be incorporated in the circuit breaker shown in FIGS. 1–3. This system includes a differential transformer 201 for monitoring the flow of current in a distribution system, amplifier means 202 for amplifying the output of the differential transformer, integrator means 203 for integrating the output of the amplifier, switching means 204 for energizing an interrupter 206 when the integrated output of the amplifier reaches a predetermined level, a power supply 207, and a pulse generator 208 and coupling transformer 209 which prevent the system from being defeated by grounding of the neutral conductor at the load.

The system is shown in connection with a distribution system having a line conductor 211 and a neutral conductor 212 which carry current between a source and a load. The neutral conductor is connected to ground at its source, end, as indicated at 213. The protective system can be utilized with either single phase or polyphase power distribution systems having one or more line conductors and a neutral conductor which is connected to ground at its source end.

The differential transformer 201 includes a toroidal core 216 which is fabricated of a material having a relatively high magnetic permeability. The conductors 211 and 212 pass through this core to form single turn primary windings. A multiple turn secondary winding 217 is wound on the core, and in one presently preferred embodiment this winding has 1,000 turns. The conductors 211 and 212 are arranged in such manner that equal currents flowing through them produce a zero net magnetic flux in the toroidal core 216 and a zero output signal in the secondary winding 217. When the currents in the conductors are not equal, a non-zero net magnetic flux is produced in the core 216, and a fault signal is produced in the secondary winding 217. An electrostatic shield 218 is provided between the conductors 211, 212 and the toroidal core 216. This shield is electrically insulated from the conductors 211, 212 and the secondary winding 217, and it is connected electrically to a common conductor 219 in the protective system.

The amplifier means 202 includes an operational amplifier 221. One end of the secondary winding 217 of the differential transformer is connected to the inverting input of this amplifier through an input resistor 222. The other end of the secondary winding is connected to the noninverting input of the operation amplifier. A pair of oppositely polarized diodes 223 and 224 are connected across the secondary winding 217 to protect the input of the operational amplifier from being damaged by excessively large fault signals.

The output of the operationsl amplifier 221 is connected to the anode of a diode 226. A load resistor 227 is connected between the cathode of this diode and the noninverting input of the amplifier. A capacitor 228 and a resistor 229 are connected in series with each other across the load resistor 227 to provide an increased load at higher frequencies.

Temperature compensation for operational amplifier 221 is provided by feedback resistors 231 and 232 in conjunction with diode 226. Resistor 231 is connected between the anode of the diode and the inverting input terminal of the operational amplifier, and resistor 232 is connected between the cathode of the diode and the inverting input. The amount of feedback is determined by the parallel resistance of the feedback resistors, and the amount of temperature compensation is determined by the ratio of these resistors. In one preferred embodiment, the feedback resistors are chosen to provide sufficient feedback to reduce the gain of the operational amplifier from a gain on the order of 1,000 to a gain on the order of a few hundred, and the ratio of the resistors is adjusted to stabilize the amplifier. This arrangement has been found to provide unusually good temperature stability in a ground fault system operating over the wide range of temperatures.

If desired, other temperature sensitive elements can be used in place of diode 226, provided that another diode or rectifying element is connected in series with resistor 227 to detect the amplified signal. Other suitable elements include thermistors and other temperature sensitive resistors. Likewise, the temperature compensation can be increased by utilizing another diode or other temperature sensitive device in series with diode 226 and resistor 232.

A resistor 233 is connected between the inverting and noninverting inputs of the operational amplifier 221. This resistor serves to suppress an undesired mode of amplification which would otherwise result from the action of the diode 226. During the positive half cycle of the output of the operational amplifier, negative feedback is provided through both of the feedback resistors 231 and 232, but during the negative half cycle such feedback occurs only through the resistor 231. Thus, with the feedback resistors approximately equal in value, the amount of feedback and, consequently, the gain of the amplifier would vary by a factor of approximately two between the positive and negative half cycles. The secondary winding 217 of the differential transformer would act as a voltage doubler, tending to overcome the difference in gain. This type of amplification is relatively unstable, and the resistor 233 is included to suppress it.

As is discussed more fully hereinafter, the power supply 207 provides a source of voltage between a conductor 234 and the common conductor 219, with the conductor 234 being positive relative to the common conductor. Operating power is supplied to the operational amplifier 221 by means of leads 236 and 237 which are connected from the appropriate terminals of the operational amplifier to the positive conductor 234 and the common conductor 219, respectively. A resistor 238 is connected between the positive conductor 234 and the noninverting input of the operational amplifier, and a resistor 239 is connected between the noninverting input and the common conductor 219. These resistors are chosen to have values which bias the noninverting input to the level required for proper operation of the operational amplifier. Typically, this level is on the order of a few volts positive relative to the negative supply voltage, that is a few volts positive relative to the common conductor 219.

Input offset resistors 241 and 242 are shown connected between the input offset terminals of the operational amplifier and the common conductor 219. The values of these resistors are chosen to provide the desired input offset voltage, and with many operational amplifiers one of these resistors can be eliminated. A capacitor 243 is connected between the input offset terminals to suppress noise and reduce the effects of stray capacitance from conductors 211 and 212 which are relatively large noise sources.

The integrating means 203 includes a capacitor 246 which is connected for being charged by the output of the operational amplifier. One side of this capacitor is connected to the junction of the load resistors 227, 229 and the noninverting input terminal of the amplifier, and the other side of the capacitor is connected to the common conductor 219. The resistor 239, which helps to set the biasing level of the noninverting input, also serves as a bleeder on the integrated capacitor.

The switching means 204 includes a silicon controlled rectifier 248 and a zener diode 249. As is discussed more fully hereinafter, the anode of the SCR 248 is connected directly to the unregulated output of the power supply 207 by a lead 251. The cathode of the SCR is connected to the common conductor 219, and a capacitor 252 is connected between the anode and cathode of the SCR. This capacitor tends to suppress transient disturbances originating in the power distribution system. The anode of the zener diode 249 is connected to the gate of the SCR, and a resistor 253 is connected between the gate and the common conductor 219. The cathode of the zener diode is connected to the integrator capacitor 246 through a resistor 256 and the secondary winding 217 of the differential transformer. The zener diode determines the level to which the capacitor 246 must be charged to fire the SCR. In the preferred embodiment this diode has a zener voltage of 16 volts.

The interrupter means 206 includes a set of contacts 258 and an operating coil 259. The contacts 258 are normally closed, and they are connected in series with the line conductor 211. These contacts are adapted for opening to interrupt the flow of current in the conductor when the coil 259 is energized. If desired, similar sets of contacts can be provided in the neutral conductor 212 and/or in additional line conductors in the distribution system.

The power supply means 207 receives a.c. input power from the distribution system and delivers d.c. operating power to the remainder of the protective system. This means includes a full-wave bridge rectifier consisting of diodes 261–264. One input of the rectifier bridge is connected to the neutral conductor 212 by a lead 266, and the other input terminal of the bridge is connected to one end of the operating coil 259 by a lead 267. The other end of this coil is connected to the line conductor 211. The normal operating current drawn by the protective system is less than the minimum value required to energize the coil 259 to open the contacts 258. A capacitor 269 is connected between the two input terminals of the rectifier bridge. This capacitor cooperates with the coil 259 to form an effective filter for suppressing transient disturbances from the distribution system. The negative output terminal of the rectifier bridge is connected to the common conductor 219, and the positive output terminal of this bridge is connected to the positive conductor 234 through a diode 271 and a current limiting resistor 272. To conserve space, the resistor 272 can consist of two or more small wattage resistors connected in series. The lead 251, which carries current to the anode of the SCR 248, is connected to the positive output terminal of the rectifier bridge ahead of the diode 271. A zener diode 273 is connected between the output terminals of the rectifier bridge. This diode provides means for suppressing surges in the distribution system voltage to prevent false tripping of the interrupter in response to such surges. This diode has a breakdown of zener voltage higher than the voltage in the distribution system and the output of the rectifier bridge. For example, with an r.m.s. voltage of 120 volts in the distribution system, the unfiltered output of the rectifier bridge would have a peak voltage on the order of 170 volts, and the zener diode 273 might have a breakdown voltage on the order of 200 volts. A filter capacitor 271 is connected across the output of the power supply between the positive conductor 234 and the common conductor 219.

The pulse generator or pulser 208 includes a bilateral switching device 276, commonly known as a diac. A resistor 277 is connected between the positive conductor 234 and one terminal of the diac. The junction of the resistor and the diac terminal is connected to one end of a multiple turn winding 278 on the coupling transformer 209. The other end of this winding is connected to the second terminal of the diac through a capacitor 279. The junction of the capacitor and second terminal is connected to the common conductor 219.

The coupling transformer 209 provides means for coupling the output of the oscillator 208 to the line and neutral conductors. This transformer includes a toroidal core 281 which is fabricated of a material having a high magnetic permeability. The winding 278 is wound on this core, and the line and neutral conductors pass through it.

The pulser 208 serves a dual function. First, it produces a continuous series of pulses which are coupled to the line and neutral conductors to provide grounded neutral protection and protection against shorting of the line conductor to an unprotected conductor. Second, it regulates the output of the power supply at a voltage level corresponding to the firing level of the diac. In the preferred embodiment, the diac has a firing voltage on the order of 32 volts, and the oscillator regulates the voltage between the positive conductor 234 and the common conductor 219 at a level on the order of 32 to 38 volts, as is more fully discussed hereinafter.

Although a pulse generator such as the pulser 208 is the presently preferred type of oscillator for use in the present invention, other types of oscillators can be used if desired. Such an oscillator might, for example, produce a sinusoidal signal having a frequency on the order of a few kilohertz. Because of its short duty cycle, the pulser has one important advantage over a continuous wave oscillator in that it requires substantially less power for operation.

Operation and use of the protective system shown in FIG. 10 can be described briefly. In the absence of a ground fault, the currents in the line and neutral conductors 211, 212 produce a zero net magnetic flux in the differential transformer core 216 and a zero output signal in the secondary winding 217. The output of the operational amplifier 221 is also zero, and the voltage across the integrating capacitor 246 remains at the level to which the noninverting input of the operational amplifier is biased. Since this level is below the breakdown voltage of the zener diode 249 which controls the firing of the SCR 248, the SCR remains turned off. In this situation, the current drawn from the power supply 207 is less than the value which will energize the interrupter coil 259, and the contacts 258 remain closed.

When a ground fault occurs, the currents in the line and neutral conductors 211, 212 are no longer balanced, and a fault signal is produced in the differential transformer secondary winding 217. This fault signal is amplified by the operational amplifier, and the amplified fault signal is rectified by the diode 226 and then applied to the integrating capacitor 246 through the load resistor 227. When the capacitor 246 is charged to the level determined by the breakdown voltage of the zener diode 249, the SCR 248 fires, substantially increasing the current drawn from the power supply 207. This increase in current energizes the coil 259 to the point where the contacts 258 open, interrupting the flow of current in the distribution system.

The pulser 208 operates continuously. The capacitor 279 is charged by current flowing through the resistor 277 and the coupling transformer winding 278 which functions as an inductor. When the voltage across the capacitor 279 and the inductor 278 reaches the firing voltage of the diac 276, the diac fires, discharging, the capacitor 279 through the inductor 278. When the charge on the capacitor 279 falls below the minimum value for maintaining the diac in its conductive state, the diac turns off. The charge on the capacitor 279 then begins to charge again with current from the resistor 277, and the cycle repeats. The voltage pulse generated in the inductor 278 is coupled to the line and neutral conductors by the transformer 209. If the neutral conductor becomes grounded on the load side of the differential transformer 201, a pulse current is induced in this conductor by the transformer 209. This current flows through the neutral conductor to ground on the load side of the differential transformer and back to the neutral conductor through the ground connection at the source end of this conductor. This pulse current produces a current imbalance in line and neutral conductor which is sensed by the differential transformer and results in the contacts 258 being opened. Similarly, a pulse current will be induced in the line conductor 211 if this conductor should become shorted to an unprotected conductor or if it should become shorted to itself on both sides of the protective system.

The pulse width and repetition rate are determined by the values of the resistor 277 and the capacitor 279, the inductance of the winding 278, the firing voltage of the diac 276 and the output voltage of the power supply 207. In the preferred embodiment, these values are chosen to provide a repetition rate substantially greater than the frequency of the current in the distribution system. This rate varies somewhat with the output voltage of the rectifier bridge, but this variation is not detrimental to the operation of the system. The values of the capacitor 228 and resistor 229 in the output of the amplifier are chosen to pass the pulse frequency. Thus, these components bypass the load resistor 227 and increase the sensitivity of the system to the pulse current.

The manner in which the pulser regulates the output of the power supply can now be described briefly. Without the pulser connected to the power supply, the voltage across the filter capacitor 274 would be substantially equal to the peak output voltage of the rectifier bridge, i.e. on the order of 170 volts. However, the action of the diac 276 prevents the voltage from reaching this value. The values of the resistor 277 and capacitor 279 are chosen to be such that the diac fires each time the voltage on the filter capacitor 274 builds up to about 32 volts. When the diac fires, the filter capacitor is discharged through the resistor 277 and the diac. The diac turns off when the voltage on the capacitor 274 drops to approximately 29 volts. Thus, the voltage on the filter capacitor is regulated at a level between 29 and 32 volts.

The system shown in FIG. 10 provides reliable interruption in response to very small fault currents, and it is relatively immune to false tripping. In the preferred embodiment, the gain of the operational amplifier 221, the values of the components in the integrator 203, and the breakdown voltage of the zener diode 249 are chosen so that the SCR 248 will fire, interrupting the flow of current in the distribution circuit, in response to fault currents as small as 4 ma. or less. The use of the zener diode in series with the gate of the SCR provides a higher threshold voltage and a more sharply defined firing level than would otherwise be possible. The action of the integrator 203 is such that larger fault currents require less time to produce tripping than do smaller fault currents. The bleeder resistor 239 prevents small disturbances, such as noise, from building up on the integrator capacitor 246 and causing false tripping. The interrupter coil 259 and the capacitors 269 and 252 provide an effective filter for preventing transient disturbances in the distribution system from causing false tripping, and the zener diode 273 further prevents false tripping due to large transients, such as line surges.

The circuit of FIG. 10 can be constructed in the form of a small modular package which is readily mounted within the casing 11 of the circuit breaker as indicated by the reference numeral 62 in FIGS. 1-3. Although a new set of references numerals has been applied to the elements in FIG. 10, certain of these elements correspond to certain of the elements shown in FIGS. 1-3. Thus, for example, the differential transformer 201 corresponds to the differential transformer 46, and the operating coil 259 corresponds to the solenoid coil 58. Similarly, the line conductor 211 and the neutral conductor 212 correspond to the line conductor 48 and the neutral conductor 49, respectively.

It is apparent from the foregoing that a new and improved circuit breaker with ground fault responsive means has been provided. This circuit breaker is suitable for protecting human life from electrical shock and is also suitable for mounting in a panelboard to provide individual ground fault protection for a plurality of branch circuits. While only the presently preferred embodiment of the invention has been described, as will be apparent to those familiar with the art, certain changes and modifications can be made without departing from the scope of the invention as defined by the following claims.

We claim:

1. In a panelboard assembly of the type adapted for use at the electrical service entrance of a building for distributing current from the main lines feeding the building to a plurality of branch circuits, said main lines and said branch conductors each including line and neutral conductors, the neutral conductor of the main lines being connected to ground at its source end, said panelboard assembly comprising: a housing, an electrically conductive bus bar member within said housing and adapted for connection to one of the main lines, a plurality of plug-in type circuit breakers disposed side by side in said housing, each of said circuit breakers having an electrically conductive terminal releasably engaging the bus bar member and holding the breaker in a predetermined position in said housing, each of said breakers also having means for connection to the conductors of a separate branch circuit, said circuit breakers each having a set of contacts adapted for interrupting the flow of current to the branch circuit connected thereto when said current exceeds a predetermined level, at least one of said circuit breakers also having highly sensitive ground fault responsive means connected to the contacts therein for interrupting the flow of current to the branch circuit connected to said breaker in response to a ground fault current in said branch circuit, the breaker with ground fault responsive means, also including means for producing an additional current in the neutral conductor of the branch circuit associated therewith in the event that said conductor is grounded, said additional current being of substantially higher frequency than the current in the main lines, said breaker with ground fault protection being of a size and construction so that it is interchangeable with and can fit in the same space as a conventional circuit breaker without ground fault protection.

2. In an electric circuit breaker with ground fault protection for use in a panelboard of the type having a power circuit with line and neutral conductors and a plurality of branch circuits having line and neutral conductors, said panelboard being capable of receiving said by side a plurality of conventional circuit breakers without ground fault protection, a small casing fabricated of insulative material, a set of electrical contacts mounted in said casing movable between open and closed positions, operating means disposed in said casing operably connected to said contacts for moving said contacts to their open position in response to a current through said contacts in excess of a predetermined magnitude, highly sensitive ground fault responsive means disposed in said casing for monitoring the flow of current in the branch circuit conductors and causing said contacts to move to their open position in response to a ground fault current on the order of 5 milliamperes, and means in said casing for producing an additional current in the neutral conductor upon grounding of said conductor, said additional current being of substantially higher frequency than the current normally supplied to the branch circuit, said circuit breaker with ground fault protection being of a size and construction so that it is interchangeable with and can fit in the same space as a conventional circuit breaker without ground fault protection.

3. In an electric circuit breaker with ground fault protection for use in a panelboard of the type having a power circuit with line and neutral conductors and a plurality of branch circuits having line and neutral conductors, said panelboard being capable of receiving side by side a plurality of conventional circuit breakers without ground fault protection, a casing fabricated of insulative material, a set of electrical contacts mounted in said casing movable between open and closed positions, operating means including a releasable latch member disposed in said casing, said operating means being operably connected to said contacts and adapted for moving said contacts to their open position when said latch member is released, overcurrent responsive means in said casing for releasing said latch member when the current through the contacts exceeds a predetermined level, solenoid means in said casing distinct from said overcurrent responsive means, said solenoid means being operably connected to said operating means for releasing said latch member, ground fault responsive means in said casing for monitoring the flow of current in the branch circuit conductors and actuating said solenoid means in response to an imbalance on the order of 5 milliamperes, and means in said casing for producing an additional current in the neutral conductor of the branch circuit in the event that said conductor is grounded, said additional current being of substantially higher frequency than the current normally supplied to the branch circuit, said circuit breaker with ground fault protection being of a size and construction so that it is interchangeable with and can fit in the same space as a conventional circuit breaker without ground fault protection.

4. In a circuit breaker with ground fault protection for use in a panelboard of the type having a power circuit with line and neutral conductors and a plurality of branch circuits having line and neutral conductors capable of receiving a plurality of conventional circuit breakers disposed side by side in said panelboard which are of the type without ground fault protection, said circuit breaker with ground fault protection comprising a casing, first and second terminals mounted in said casing, a set of electrical contacts connected to said terminals and mounted in said casing and movable between open and closed positions, manually controllable means having a member extending out of said casing for moving said contacts between said open and closed positions, means in said casing for automatically opening said contacts in response to an excessive current flow through said contacts, ground fault means in said casing coupled to said electrical contacts for monitoring the flow of current in the branch circuit conductors to which the electrical contacts are connected for causing said electrical contacts to move to an open position in response to a ground fault current, and means in said casing for producing an additional current in the neutral conductor of the branch circuit to which the contacts are connected in the event that said conductor is grounded, said additional current being of substantially higher frequency than the current normally supplied to the branch circuit, said circuit breaker with ground fault protection being of a size and consturction so that it is interchangeable with and can fit in the same space as a conventional circuit breaker without ground fault protection.

5. A circuit breaker as in claim 4 together with manually operable means mounted in said casing and having a member extending out of the casing for simulating a ground fault condition to test the ground fault means when said circuit breaker is in said panelboard and is carrying a load.

6. A current breaker as in claim 5, together with means carried by the casing giving an indication as to whether said circuit breaker with ground fault protection is operative when a ground fault condition is simulated.

7. A circuit breaker as in claim 4 wherein said ground fault means includes sensing means for monitoring the flow of current in the branch circuit conductors and producing a fault signal when the current flowing toward the branch circuit is not equal to the current flowing back through the conductors from the branch circuit, solenoid means having an operating coil and an armature member connected for causing said contacts to move to their open position in response to energization of said operating coil, and signal conditioning means intermediate said sensing means and said solenoid means for energizing said operating coil in response to said fault signal.

8. A circuit breaker as in claim 7 wherein said sensing means includes a differential transformer having a generally toriodal core of magnetic material, a plurality of primary windings passing through said core and adapted to be connected in series with the conductors in the branch circuit, and a secondary winding wound on said core and connected to said signal conditioning means.

9. A circuit breaker as in claim 4 together with the indicator means carried by the casing and visible externally thereof for indicating movement of said contacts to their open position in response to a ground fault current.

10. In an electric circuit breaker of the type suitable for mounting in a panelboard for protecting an individual branch circuit, a small casing fabricated of insulative material, a set of electrical contacts mounted in said casing movable between open and closed positions, operating means disposed in said casing operably connected to said contacts for moving said contacts to their open position in response to a current through said contacts in excess of a predetermined magnitude, sensing means for monitoring the flow of current in the conductors of a branch circuit and producing a fault signal when the current flowing toward the branch circuit is not equal to the current flowing back through the conductors from the branch circuit, solenoid means having an operating coil and an armature member connected for causing said contacts to move to their open position in response to energization of said operating coil, magnetic flux storage means for receiving the fault signal from said sensing means and storing a magnetic flux signal in response to said fault signal, means connected to said flux storage means for reading the stored flux signal out of said storage means, and means connected to the operating coil of said solenoid means for energizing said operating coil in response to the flux signal read out of said storage means.

11. In an electric circuit breaker of the type suitable for mounting in a panelboard for protecting an individual branch circuit, a small casing fabricated of insulative material, a set of electrical contacts mounted in said casing movable between open and closed positions, operating means disposed in said casing operably connected to said contacts for moving said contacts to their open position in response to a current through said contacts in excess of a predetermined magnitude, sensing means for monitoring the flow of current in the conductors of a branch circuit and producing a fault signal when the current flowing toward the branch circuit is not equal to the current flowing back through the conductors from the branch circuit, solenoid means having an operating coil and an armature member connected for causing said contacts to move to their open position in response to energization of said operating coil, modulation means for receiving the fault signal from said sensing means and modulating a carrier signal with said fault signal, amplifier means for increasing the amplitude of the modulated signal from said modulation means, and means for demodulating the amplifed modulated signal to recover the fault signal therefrom and energizing the operating coil of said solenoid means in response to said fault signal.

12. In an electrical circuit breaker of the type suitable for mounting in a panelboard for protecting an individual branch circuit, a small casing fabricated of insulative material, a set of electrical contacts mounted in said casing movable between open and closed positions, operating means disposed in said casing operably connected to said contacts for moving said contacts to their open position in response to a current through said contacts in excess of a predetermined magnitude, sensing means for monitoring the flow of current in the conductors of a branch circuit and producing a fault signal in response to an imbalance on the order of 5 milliamperes between the current flowing toward the branch circuit and the current flowing back through the conductors from the branch circuit, solenoid means having an operating coil and an armature member connected for causing said contacts to move to their open position in response to energization of said operating coil, an operational amplifier having inverting and noninverting inputs for amplifying the fault signal, temperature compensation means including a solid state device connected between the output and the inverting input of the operational amplifier, integrator means for integrating the amplified fault signal, and switching means for energizing said operating coil when the output of said integrator means reaches a predetermined level.

13. In an electric circuit breaker for use in a panelboard for distributing power from a power circuit having line and neutral conductors to a plurality of branch circuits each having line and neutral conductors, the neutral conductor of the power circuit being connected to ground, the panelboard having an enclosed housing with a panel forming one wall thereof and electrically conductive bus bars mounted at a predetermined location within the housing and connected to the line conductors of the power circuit: a casing, electrical conductors within the casing for connection between the line and neutral conductors respectively of the power and branch circuits, a terminal connected to one of the conductors within the casing and extending from one side of the casing for releasably engaging one of the bus bars in the panelboard to support the breaker in a predetermined position in the panelboard, electrical contacts connected in series with at least one of the conductors within the casing and movable between open and closed positions for completing or interrupting a circuit between the power circuit and branch circuit conductors to which the at least one of the conductors is connected, manually controllable means having a member extending out of the casing for moving the contacts between their open and closed positions, said member extending from the side of the casing opposite to the terminal and being adapted to extend through an opening in the panel when the circuit breaker is installed in the panelboard with the terminal engaging the bus bar, means in the casing for moving the contacts to their open position in response to a current flow through the contacts in excess of a predetermined magnitude, ground fault responsive means in the casing for comparing the currents in the conductors within the casing and causing the contacts to move to their open position in the event of an imbalance in said currents, and means within the casing for automatically producing an additional current in the conductor connected to the neutral conductors to produce an imbalance in the currents compared by the ground fault responsive means in the event that the neutral conductor of the branch circuit is grounded, said additional current being of substantially high frequency than the power circuit current.

14. A circuit breaker as in claim 13 wherein the ground fault responsive means includes sensing means for comparing the currents in the conductors within the casing and producing a fault signal in the event of an imbalance in the currents flowing in said conductors, solenoid means having an operating coil and an armature member for causing the contacts to move to their open position, and signal conditioning means connected intermediate the sensing means and the operating coil for conditioning the solenoid means to cause the contacts to move to their open position in response to the fault signal.

* * * * *

UNITED STATES PATENT AND TRADEMARK OFFICE
CERTIFICATE OF CORRECTION

PATENT NO. : 4,000,444
DATED : December 28, 1976
INVENTOR(S) : ELLWOOD S. DOUGLAS, RICHARD C. DOYLE, DAVID WILLIAM NESTOR, and WALLACE W. WAHLGREN It is certified that error appears in the above-identified patent and that said Letters Patent are hereby corrected as shown below:

Column 6, line 56, "fauls" should read -- fault --.

Column 11, line 13, "of" should read -- or --.

Column 11, line 20, "271" should read -- 274 --.

Signed and Sealed this

Fifth Day of April 1977

[SEAL]

Attest:

RUTH C. MASON
*Attesting Officer*

C. MARSHALL DANN
*Commissioner of Patents and Trademarks*